United States Patent [19]
Khoe et al.

[11] 4,370,021
[45] Jan. 25, 1983

[54] COUPLING ELEMENT FOR AN OPTICAL TRANSMISSION FIBER

[75] Inventors: Giok D. Khoe; Robert G. Gossink; Cornelis M. G. Jochem, all of Eindhoven, Netherlands

[73] Assignee: U.S. Philips Corporation, New York, N.Y.

[21] Appl. No.: 159,274

[22] Filed: Jun. 13, 1980

Related U.S. Application Data
[62] Division of Ser. No. 913,293, Jun. 7, 1978.

[30] Foreign Application Priority Data
Jun. 10, 1977 [NL] Netherlands ............... 7706379

[51] Int. Cl.³ .............................................. G02B 5/14
[52] U.S. Cl. .................................................. 350/96.18
[58] Field of Search ................ 350/96.18, 96.20; 65/3.11

[56] References Cited
U.S. PATENT DOCUMENTS
4,143,940 3/1979 Khoe ................... 350/96.18

FOREIGN PATENT DOCUMENTS
52-45938 4/1977 Japan ................. 350/96.18

OTHER PUBLICATIONS
*Journal of Applied Physics*, vol. 47, No. 1, Jan. 1976, pp. 177-179, Kohanzadeh, Y., "Injection Laser Coupling to Optical Waveguides with Integral Lenses".

*Primary Examiner*—Stanley D. Miller
*Assistant Examiner*—Frank Gonzalez
*Attorney, Agent, or Firm*—Marc D. Schechter

[57] ABSTRACT

A coupling element for coupling a laser radiation source to a monomode optical transmission fiber. The end of the fiber is monotonically flattened at a temperature at which the fiber core has a viscosity of between $10^7$ to $10^{8.5}$ poises. The fiber has a cladding glass chosen to have a viscosity of between $10^{10}$–$10^{11}$ poises at the flattening temperature. This causes the core glass to emerge in the form of a semi-ellipsoidal lens, when the fiber is flattened.

3 Claims, 5 Drawing Figures

COUPLING ELEMENT FOR AN OPTICAL TRANSMISSION FIBER

This is a division, of application Ser. No. 913,293, filed June 7, 1978.

BACKGROUND OF THE INVENTION

The invention relates to a method of producing a coupling element used for coupling a radiation source in the form of a laser, a semiconductor laser in particular, to a monomode optical transmission fiber by means of a lens.

U.S. Pat. No. 4,143,940 (related to UK Pat. Appl. No. 76/18,608) discloses a device wherein the end of a flattened monomode optical transmission fiber adjacent to the laser is covered with a lens formed in situ at the core.

The production of such a coupling element, as disclosed in U.S. Pat. No. 4,143,940, will be described with reference to FIGS. 1a, 1b and 1c of the drawing of this application. FIG. 1c is a perspective view of a semiconductor laser and an optical transmission fiber. FIG. 1a is a cross-sectional view on line A—A' of FIG. 1c, and FIG. 1b is a cross-sectional view on line B—B'.

In these FIG. 1, reference 1 indicates a semiconductor laser. The laser mirrors which are obtained by the semiconductor material-to-air transition are indicated by 9 and 10 respectively. The optical fiber 3 has a sleeve 4 and a core 5. The lens on the head of the flattened core 5 is indicated by 8.

The width of the electric contact 2 ("stripe") on the laser 1 and the thickness of the active layer 11 in the laser more or less determine also the width and the thickness of the working active range of the laser. The width 2 of this range is approximately between 5 and 10 $\mu$m and the thickness between 0.5 and 1 $\mu$m. As a consequence the cross-section of the emerging laser light is not symmetrical. The divergence of the opening angle perpendicular to the active layer (FIG. 1b) is usually between 40° and 60° and parallel to the active layer (FIG. 1a) only between 10° and 30°.

In order to provide in an efficient manner a direct coupling between the laser and the monomode fiber it is necessary to use a cylindrical lens. The coupling efficiency can be increased by slightly flattening the fiber 3 after heating such that the end of the core 5 becomes elliptical. As a consequence the fiber is now adapted to better match the elliptical cross-section of the laser beam in the basic mode. Thereafter, according to the above-referenced patent, a thick layer of negative photoresist is applied on the flattened end face of the fiber 3. After exposure through the core 5 and development there remains a lens 8, which is in the form of a semi-ellipsoid. This lens has a corrective effect on the asymmetrical divergence of the laser beam. This divergence is between approximately 10° and 30° measured parallel to the strip 2 (FIG. 1a) and between approximately 40° and 60° measured perpendicularly thereto (FIG. 1b).

The method of obtaining the improved result in accordance with the FIGS. 1a, 1b and 1c rather complicated and there are reasons to doubt a long life of the lens 8.

SUMMARY OF THE INVENTION

It is an object of the invention to provide an optical coupling component of the type described above, which can be produced in a simple manner and which can be expected to have a life which is approximately equal to that of the optical fiber.

The method of producing a coupling element according to the invention, wherein a fibre is drawn starting from a body comprising a glass core material and a glass cladding material and wherein the fiber is flattened monotonically, so that the end of the core has an elliptical cross-section, is characterized in that the temperature at which flattening takes place is approximately the temperature at which the material of the core has a viscosity of between $10^7$ and $10^{8.5}$ poises and at which the material of the cladding has a viscosity of between $10^{10}$ and $10^{11}$ poises, so that during flattening the core glass emerges from the cladding and the emerged portion assumes, under the influence of its surface tension, a semi-ellipsoidal form which, on cooling of the core glass to below its transformation temperature, is fixed. The semi-ellipsoidal portion is thus formed as a unitary mass with the fiber core (i.e. it is not a separate layer on the core.) A considerable advantage of the method according to the invention relative to that which is disclosed in the above-mentioned U.S. Pat. No. 4,143,940 consists in that both the deforming of the fiber and the forming of the lens are accomplished in one step of the process.

The known requirements regarding core and cladding glasses, namely that they have coefficients of expansion which are not too widely divergent and that the index of refraction of the core glass is approximately 1% higher than that of the cladding glass, remain in force.

The invention will be explained in greater detail by way of example with reference to FIGS. 2a and 2b.

BRIEF DESCRIPTION OF THE DRAWINGS

FIG. 1a is a cross-sectional view along line A—A' of FIG. 1c of a semiconductor laser and an optical transmission fiber.

FIG. 1b is a cross-sectional view along line B—B' of FIG. 1c.

DESCRIPTION OF THE PREFERRED EMBODIMENTS

Starting from glass tubing consisting of glass having the sleeve composition and a calibrated rod of glass of the core composition, which fits in the tubing, an optical transmission fiber is drawn in the known manner while being heated. Of course the fiber can also be produced in accordance with other known methods, for example in accordance with the chemical vapor deposition method.

The cladding glass has one of the compositions I, II or III, for example, and the core glasses one of the compositions A, B or C, for example.

| Composition | Cladding glasses (wt. %) | | |
| --- | --- | --- | --- |
| | I | II | III |
| SiO$_2$ | 72.9 | 70.7 | 64.7 |
| B$_2$O$_3$ | 5.0 | 5.7 | 23.1 |

-continued

| Composition | Cladding glasses (wt. %) | | |
|---|---|---|---|
| | I | II | III |
| $Na_2O$ | 9.2 | 9.2 | 5.5 |
| $K_2O$ | 2.5 | — | 2.8 |
| CaO | 7.1 | 7.2 | — |
| $Al_2O_3$ | 3.3 | 7.2 | 3.9 |
| $\alpha_{30-300°\,C.}$ | $78 \times 10^{-7}$ | $68 \times 10^{-7}$ | $48 \times 10^{-7}$ |
| $\tau\log\eta = 10.5$ (°C.) | 650 | 670 | 600 |

$\alpha$ represents the linear coefficient of expansion and $\eta$ the viscosity in poises.

$\tau \log \eta = 10.5$ or 7.5 represents the temperature at which log $\eta$ equals 10.5 or 7.5, respectively.

| Composition | Core glasses (wt. %) | | |
|---|---|---|---|
| | A | B | C |
| $SiO_2$ | 34.9 | — | — |
| $B_2O_3$ | 22.4 | 34.4 | 44.2 |
| $Na_2O$ | 6.0 | — | — |
| BaO | — | 45.5 | 35.3 |
| CaO | 2.9 | — | 6.5 |
| MgO | 2.1 | — | 2.3 |
| PbO | 30.2 | — | — |
| $Al_2O_3$ | 1.0 | 20.1 | 11.7 |
| $\alpha_{30-300°\,C.}$ | $75 \times 10^{-7}$ | $74 \times 10^{-7}$ | $75 \times 10^{-7}$ |
| $\tau\log\eta = 7.5$ (°C.) | 600 | ~610 | ~610 |

Figure 1C:
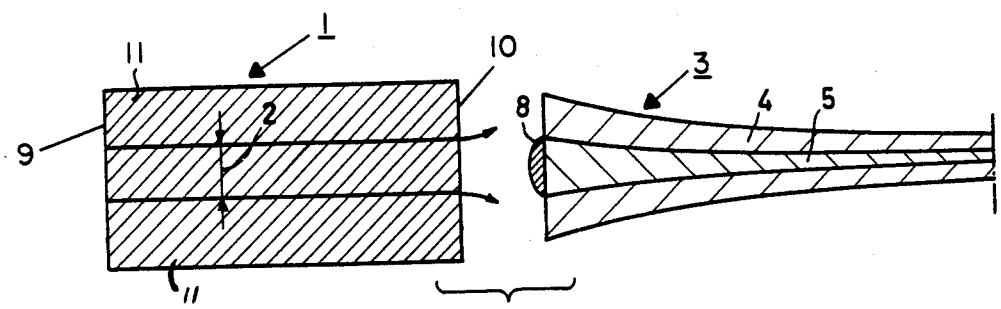
FIG. 1c is a perspective view of a semiconductor laser and an optical transmission fiber.
Figure 1C:
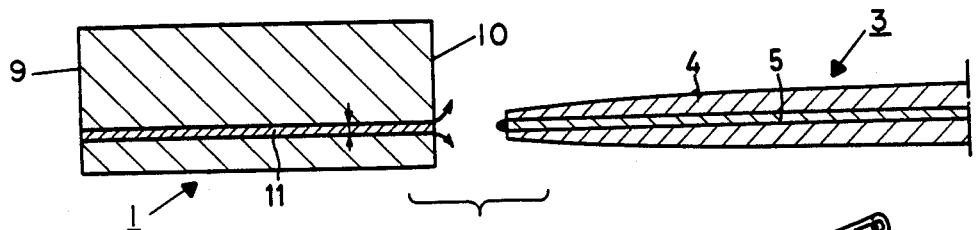
Figure 1C:
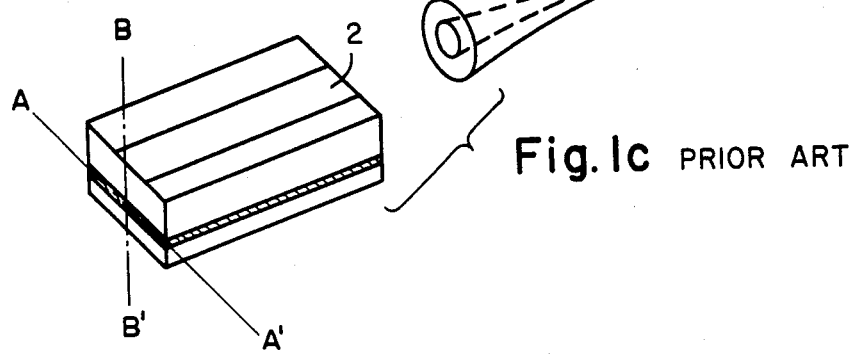
Figure 2A:
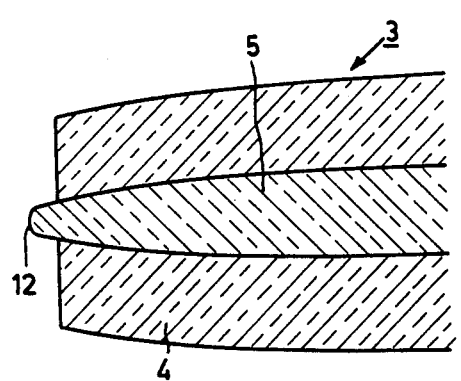
FIG. 2a is a cross-sectional view of an optical transmission fiber having a flattened end, wherein the view is taken along a line analogous to line B—B' of FIG. 1c.
Figure 2B:
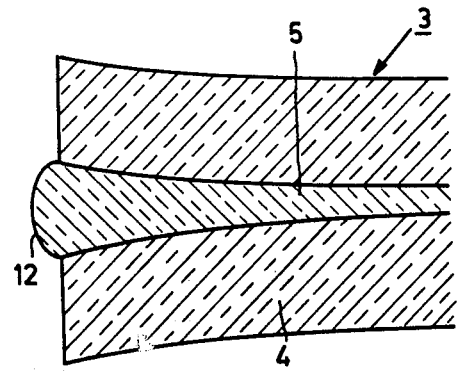
FIG. 2b is a cross-sectional view of the fiber shown in FIG. 2a as taken along a line analogous to line A—A' of FIG. 1c.

The fibers thus obtained are flattened, in such a way that the end of the core 5 becomes elliptical and that the cross-section of the core transforms monotonically from an elliptical cross-section at the fiber end ito a circular cross-section in the body of the fiber, after heating to a temperature of approximately 600° C. This produces a bulge as shown in FIGS. 2a and 2b in two cross-sections.

As can be seen by referring to the tables, above, for composition I, II, and III, the temperature at which the viscosity is equal to $10^{10.5}$ poises is 650, 670, and 600° C., respectively. For compositions A, B, and C the temperature at which the viscosity is equal to $10^{7.5}$ poises is 600, 610 and 610° C., respectively. Accordingly, at the temperature of 600° C. used in the examples, the viscosities of the core and cladding were in the desired range.

The coupling elements obtained are very satisfactory, in particular the combination III as cladding glass and A as core glass.

What is claimed is:

1. A coupling element, for coupling a radiation source to a monomode optical transmission fiber having a core and a cladding, comprising a semi-ellipsoidal lens formed as a unitary mass with the fiber core on an end of the fiber, said fiber core having a viscosity of $10^7$ to $10^{8.5}$ poises and said fiber cladding having a viscosity of $10^{10}$ to $10^{11}$ poises at a temperature at which the lens is formed.

2. A coupling element, as claimed in claim 1, characterized in that the core at the end of the fiber has an elliptical cross-section.

3. A coupling element, as claimed in claim 2, characterized in that the cross-section of the core monotonically transforms along the length of the fiber from an elliptical cross-section at the fiber end into a circular cross-section in the body of the fiber.

* * * * *